United States Patent [19]

Murphy et al.

[11] 4,196,305

[45] Apr. 1, 1980

[54] PROCESS FOR REMOVAL OF PHENOLS FROM DILUTE AQUEOUS SOLUTIONS THEREOF

[75] Inventors: Clarence R. Murphy; S. Paul Thackaberry, both of Houston, Tex.; Robert E. Boehme, deceased, late of Houston, Tex.; by Helen J. Boehme, legal representative, Kalamazoo, Mich.

[73] Assignee: Gulf Oil Corporation, Pittsburgh, Pa.

[21] Appl. No.: 932,727

[22] Filed: Aug. 10, 1978

[51] Int. Cl.$^2$ .............................................. C07C 37/24
[52] U.S. Cl. ..................................................... 568/758
[58] Field of Search ................................ 568/758, 724

[56] References Cited

U.S. PATENT DOCUMENTS

| 2,861,948 | 11/1958 | McKellar | 568/758 |
| 3,377,369 | 4/1968 | Sargent et al. | 568/758 |
| 3,597,351 | 8/1971 | Landenburg | 568/758 |

OTHER PUBLICATIONS

Rohm & Haas Co., Amberlite XAD-2, Jun. 1965.

Primary Examiner—Werren B. Lone
Attorney, Agent, or Firm—Richard L. Kelly

[57] ABSTRACT

A process is disclosed for removing phenols from dilute aqueous solutions thereof. The method consists of contacting the aqueous phenol solution with a mass of olefin polymer fibrils which absorb the phenol from the aqueous solution. Water treated by the method does not give a characteristic phenol color when tested with ferric chloride.

3 Claims, No Drawings

PROCESS FOR REMOVAL OF PHENOLS FROM DILUTE AQUEOUS SOLUTIONS THEREOF

BACKGROUND OF THE INVENTION

Phenols are considered to be very objectionable pollutants in water. Accordingly, regulatory agencies require that users of water for industrial purposes remove essentially all phenols from industrial waters before they are discharged. This presents a difficult and expensive problem for water users, particularly in removing phenols from dilute aqueous solutions. As a consequence, industrial water users are seeking more convenient and less expensive methods for removing phenols from dilute aqueous solutions.

SUMMARY OF THE INVENTION

The invention comprises removing a phenol from a dilute aqueous solution thereof by contacting the aqueous phenol solution with a mass of olefin polymer fibrils. The fibrils absorb the phenol from the aqueous solution.

DETAILED DESCRIPTION OF THE INVENTION

The olefin polymer fibrils employed in the practice of the invention constitute a recognized class of materials known and described in the art. Such fibrils are prepared by precipitating an olefin polymer from an organic solvent solution thereof under conditions of high shear. Representative U.S. patents disclosing the preparation of such fibrils include the following:

U.S. Pat. Nos. 2,988,782; 3,081,519; 3,341,242; 3,740,383; 3,743,272; 3,808,091; 3,885,014; 3,891,499; 4,010,229; 4,013,751.

When examined with the naked eye, the olefin polymer fibrils employed in the invention resemble in appearance natural fibers such as cotton and staple fibers of solution spun polymers such as nylon and the like. When examined microscopically, however, fibrils have grossly irregular shapes, including segments which appear to be film-like in nature. See for example FIG. 4 of U.S. Pat. No. 3,891,499. It's believed possible that these particular physical characteristics may play a role in the function of the olefin polymer fibrils in the present invention.

The majority of the olefin polymer fibrils employed in the practice of the invention are small in size, with the largest dimension not exceeding about 10 mm. The fibrils have a large surface to weight ratio of at least about 2 $m^2$/gram as determined by nitrogen absorption/desorption methods.

The olefin polymer fibrils preferred for use in the invention are prepared from an ethylene or propylene polymer having a weight average molecular weight of at least about 1 million and preferably at least about 1.5 million. Such polymers will have an intrinsic viscosity of at least 3.5, preferably at least 5.0, and most especially at least 10.0. A listing of suitable olefin polymers and olefin polymer mixtures is set forth in U.S. Pat. No. 4,013,751, which description is incorporated herein by reference.

As disclosed in U.S. Pat. No. 4,049,493, many olefin polymer fibrils are refined in the presence of aqueous polyvinyl alcohol solutions in one step of their preparation. Such fibrils bear a coating of polyvinyl alcohol and are particularly effective when used in practice of the present invention.

Any type of water-soluble phenol, including phenol itself, cresol, mixed phenols derived from coal tar, and other phenols of commerce can be removed from dilute aqueous solutions by the method of the invention. While the method of the invention can be employed to remove phenols from relatively concentrated aqueous solutions, the maximum economic benefits of the invention are obtained in removing phenols from dilute solutions containing less than 1 and preferably less than 0.5 weight % of phenol. This results from the fact that the removal of the bulk of the phenol from relatively concentrated aqueous solutions can be accomplished by known relatively low cost methods. Accordingly, in the treatment of relatively concentrated aqueous phenol solutions, it is preferred to remove the bulk of the phenol from the solution by known methods to reduce the phenol concentration to 1 weight % or less. The removal of the final traces of the phenol, which is difficult and costly by known methods, then is effected by the method of the present invention. The method of the invention is highly efficient in that water treated by the method does not give a characteristic phenol color when tested with ferric chloride.

The method of the invention is carried out by simply bringing the dilute aqueous phenol solution into contact with an appropriate quantity of the olefin polymer fibrils. Where relatively small quantities of a phenol solution are to be treated, the fibrils can be slurried with the aqueous phenol solution and filtered. Where relatively large quantities of aqueous phenol solution are to be treated, it is preferred practice to pack a column with the fibrils and to pass the solution therethrough.

It has been observed that fibrils having a surface area of approximately 3 $m^2$/gram will remove at least 0.04 gram of phenol per gram of fibrils before losing their capacity to absorb further phenol. When the absorptive capacity of the fibrils is reached, the fibrils can be regenerated by treating them with a solution capable of dissolving the phenol from the surface of the fibrils. Dilute solutions of inorganic bases are particularly well suited for this purpose. Alternatively, the fibrils can be regenerated by treatment with organic solvents capable of dissolving phenol. Typical examples of such solvents include diethyl ether, chloroform, carbon tetrachloride, petroleum ether, acetone, and the like.

The following example is set forth to illustrate more clearly the principles and practice of this invention to those skilled in the art. Where parts or percentages are referred to, they are parts or percentages by weight unless otherwise noted.

EXAMPLE 1

Part A

A lot of fibrils was prepared following the procedure of Example 1 of U.S. Pat. No. 4,013,751. The ethylene polymer from which the fibrils were prepared had a weight average molecular weight of about 1,500,000. The hydrocarbon-wet fibrils were refined two times for 120 seconds in a Waring Blendor employing 100 parts of 91% isopropanol per part of fibrils. The fibrils were filtered and pressed to expel the maximum quantity of isopropanol.

Ten grams of the fibrils and 1,000 grams of water containing 1 gram of polyvinyl alcohol (Vinol 540) were stirred for 60 seconds in a Waring Blendor to prepare a fine dispersion of fibrils in the water. The fibrils were filtered, washed with water, refiltered and dried.

Part B

A column 1½" deep and having an internal diameter of 0.38" was packed with 0.7 gram of the fibrils from Part A. An aqueous solution containing 0.15 weight % phenol was passed through the column at a rate of 10 ml/min. The column effluent gave a negative test for phenol using the ferric color test for phenol. The fibrils had absorbed 15 grams of phenol per pound of dry fibrils before the water effluent gave a color test for phenol.

What is claimed:

1. A process for removing a water-soluble phenol from an aqueous solution thereof containing less than 1 weight % of said phenol which consists essentially of passing said aqueous phenol solution through a column packed with a mass of olefin polymer fibrils; said olefin polymer being selected from the group consisting of:
  a. an ethylene homopolymer,
  b. a copolymer containing at least 90 weight % of polymerized ethylene and the balance a polymerized olefin hydrocarbon containing at least 4 carbon atoms,
  c. a propylene homopolymer,
  d. a copolymer containing at least 50 weight % of polymerizd propylene and the balance polymerized ethylene; and
  e. a mixture of any of (a), (b), (c), and (d) said fibrils having been prepared by precipitating an olefin polymer from an organic solvent solution thereof under conditions of high shear.

2. The process of claim 1 in which the olefin polymer fibril is an ethylene polymer fibril.

3. The process of claim 2 in which the ethylene polymer fibril bears a coating of polyvinyl alcohol.

* * * * *